T. A. PANYARD.
GEARING.
APPLICATION FILED JULY 2, 1910.
975,789.
Patented Nov. 15, 1910.
2 SHEETS—SHEET 1.
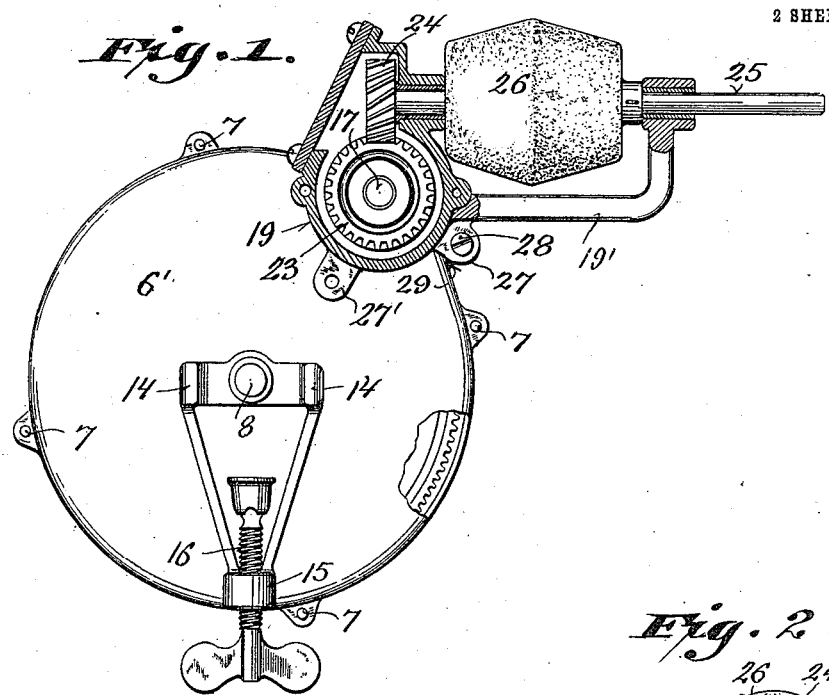
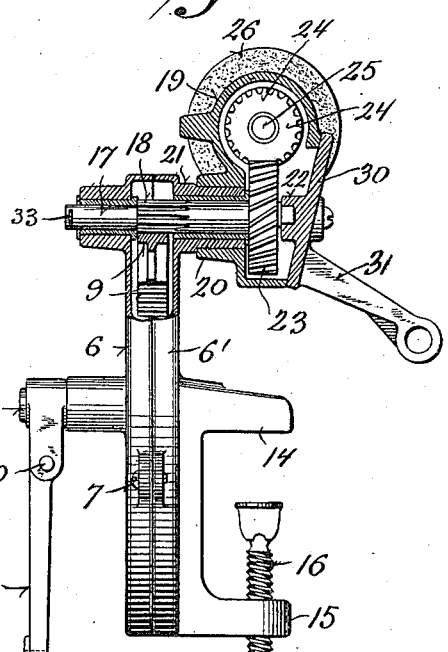
Witnesses:
Inventor
Thomas A. Panyard,
By 
Attorneys.

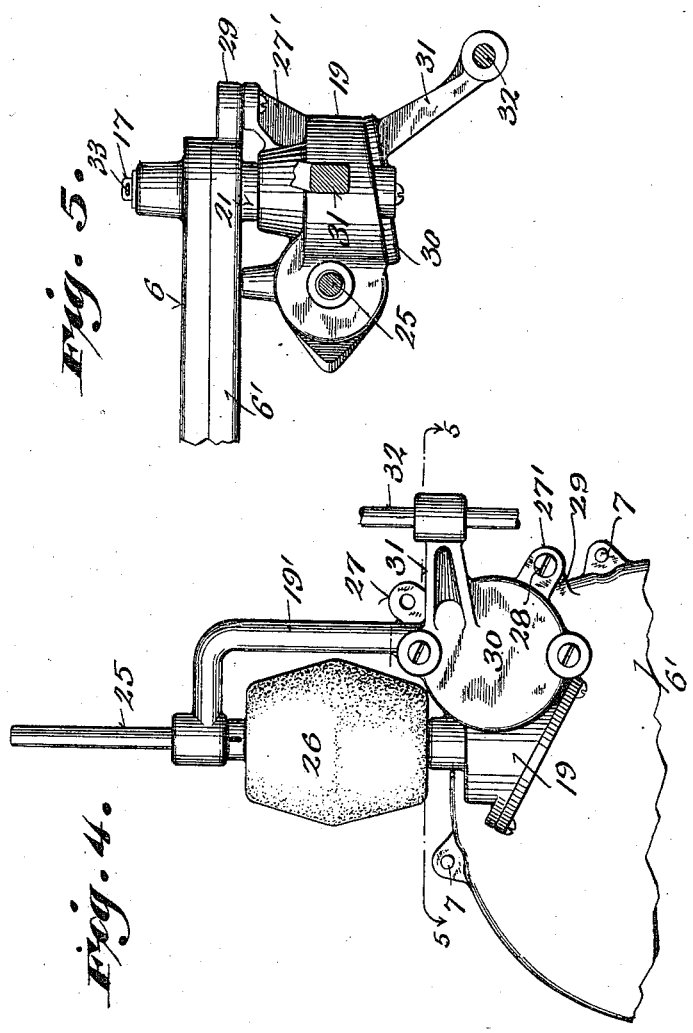

UNITED STATES PATENT OFFICE.

THOMAS A. PANYARD, OF MILWAUKEE, WISCONSIN.

GEARING.

975,789.

Specification of Letters Patent. Patented Nov. 15, 1910.

Application filed July 2, 1910. Serial No. 570,059.

*To all whom it may concern:*

Be it known that I, THOMAS A. PANYARD, a citizen of the United States, and resident of Milwaukee, in the county of Milwaukee and State of Wisconsin, have invented certain new and useful Improvements in Gearing; and I do hereby declare that the following is a full, clear, and exact description thereof.

My invention consists in what is herein particularly set forth with reference to the accompanying drawings and pointed out in the claims of this specification, its object being to provide simple, economical gearing comprising a pair of gear-connected non-intersecting spindles at right-angles to one another, and also to provide for a shift of one of the spindles from horizontal to vertical working position, this shiftable spindle being extended outward from a bearing for same to receive a grinding-wheel or other rotary tool in addition to or independent of a similar device normally in connection with said shaft between bearings for the same.

Figure 1 of the drawings represents a partly sectional side elevation of a grinding-machine embodying my improved gearing; Fig. 2, a partly sectional rear elevation of the same; Fig. 3, an end view of a gear-spindle of the machine; Fig. 4, a side elevation of a fragment of the machine illustrating the shiftable spindle of same in vertical position, and Fig. 5, a plan view of a fragment of the machine partly in horizontal section indicated by 5—5 in Fig. 4.

Referring by numerals to the drawings, 6, 6' indicate the sections of a separable main gear-case, these sections being provided with parallel ears with which clamping screws 7 are engaged. The gear-case sections are provided with bearings for the axle 8 of an inclosed spur-wheel 9, and clamped on one end of said axle, by means of a screw 10, is the split end of a crank 11 provided with a handle 12 having a screw-threaded shank. The screw-threaded shank 12' of the handle 12 is engaged with one of a series of apertures in the crank adjacent to its outer end, and clamp-nuts 13 are arranged on said shank to oppose opposite sides of said crank, the adjustment of said handle determining the leverage of the aforesaid crank. The gear-case section 6' is provided with suitably braced clamp-jaws 14 and a bearing lug 15 for a clamp-screw 16, whereby the machine as a whole may be readily attached to any suitable support. The aforesaid gear-case sections are also provided with preferably bushed bearings of different diameter of bore for a shouldered spindle 17 that is longitudinally milled upon its greatest circumference adjacent to its bearing portion of least diameter to provide a spur-pinion 18 with which the spur-wheel 9 is meshed, said spindle being in a plane parallel to that of the axle 8 aforesaid. Another separable gear-case 19, has a sleeve portion 20 thereof in slip-fit upon the bearing 21 for the spindle 17, and one end of said spindle is centered in an inner stud 22 of the latter gear-case. Fast on the spindle 17 is a worm-wheel 23 in mesh with a similar wheel 24 fast on another spindle 25 for which the gear-case 19 and a right-angle arm 19' of same are provided with preferably bushed bearings. Rigidly secured on the spindle 25 between its bearings is a sickle-grinding wheel 26, but some other grinding wheel or rotary tool may be substituted for the sickle-grinding wheel. The gear-case 19 is provided with ears 27, 27', and one or the other of these ears is held by a screw 28 in connection with an ear 29 of the main gear-case section 6' according to the rotary adjustment of the gear-case 19 to put the spindle 25 in horizontal or vertical position.

From the foregoing it will be noted that the spindles 17 and 25 are always at right-angles to one another but neither parallel nor intersecting, the meshed worm-wheels 23, 24 making it possible to transmit power from one to the other of said spindles, the tool spindle being rotated in either direction according to the throw of the aforesaid crank, and said tool spindle being extended beyond its outer bearing another grinding wheel or rotary tool may be rigidly secured in connection therewith.

A detachable section 30 of the gear-case 19 is provided with an arm 31 with which to engage a portion 32 of a work-support, as shown in Fig. 4.

A transverse key-pin 33 extends through one end of the spindle 17 to prevent the same and parts therewith from automatic displacement, but this pin being removed the gear-case 19, its contents and said spindle may be readily removed from the main gear-casing, the section 6 of which is provided with the bearing for the reduced end of the aforesaid spindle adjacent to the spur-pinion portion of same. By centering the spindle 17 in the gear-case 19 as above described, said spindle is kept in connection with said gear-case after the latter has cleared the bearing 21 with which the section 6' of the main gear-case is provided.

The shouldered spindle 18 with the gear-case 19 being removed as aforesaid, a similar spindle carrying a grinding-wheel or other rotary tool may be substituted, or the gear-wheel 23 may be detached from said spindle 18 and the latter employed in connection with a rotary tool in the absence of said gear-case and other parts therewith, especial attention being called to the aforesaid spindle 18 as having sliding connection with its bearings and fashioned to provide a spur-pinion within the area of its greatest circumference.

I claim:

1. A main gear-case, a drive-axle and a spindle for which said case is provided with bearings, the axle and spindle being in parallel planes and in gear-connection; a supplementary gear-case mounted in connection with the main gear-case upon a spindle-bearing of the same, another spindle for which the supplementary gear-case is provided with bearings, and gearing connecting the spindles.

2. A main gear-case, a drive-axle and a spindle for which said case is provided with bearings, the axle and spindle being in parallel planes and in gear-connection; a supplementary gear-case in rotary adjustable connection with a spindle-bearing of the main gear-case, means for holding the supplementary gear-case in adjusted position, another spindle for which said supplementary gear-case is provided with bearings, and gearing connecting the spindles.

3. A main gear-case, a drive-axle, and a spindle for which said case is provided with bearings, the axle and spindle being in parallel planes and in gear-connection; a supplementary gear-case mounted in connection with the main gear-case and having a bearing-arm extension, another spindle arranged to turn in the auxiliary gear-case and said arm of same beyond which it extends, and gearing connecting the spindles.

4. A main gear-case, a drive-axle and a spindle for which said case is provided with bearings, the axle and spindle being in parallel planes and in gear-connection; a supplementary gear-case mounted in connection with the main gear-case upon a spindle-bearing of same and provided with a centering stud engaged by said spindle, another spindle for which the supplementary gear-case is provided with bearings, and gearing connecting the spindles.

5. A separable main gear-case, a drive-axle and a spindle for which said case is provided with bearings, the spindle being shouldered and longitudinally milled upon its greatest circumference adjacent to its bearing portion of least diameter to provide a spur-pinion, a spur-wheel on said axle in mesh with said pinion, a supplementary gear-case mounted in connection with a main gear-case section upon a spindle-bearing of the same, a spindle for which the supplementary gear-case is provided with bearings, and gearing connecting the spindles.

6. A separable gear-case, a drive-axle and spindle for which the case is provided with bearings the spindle being of different diameters and fashioned to provide a spur-pinion within the area of its greatest circumference, a spur-wheel connected to the drive-axle and meshed with said pinion, means for securing said spindle in its bearings, and a device in connection with the aforesaid spindle to rotate therewith outside of said gear-case.

In testimony that I claim the foregoing I have hereunto set my hand at Milwaukee in the county of Milwaukee and State of Wisconsin in the presence of two witnesses.

THOS. A. PANYARD.

Witnesses:
N. E. OLIPHANT,
MAY DOWNEY.